(12) United States Patent
Ruggiero

(10) Patent No.: US 9,442,862 B2
(45) Date of Patent: Sep. 13, 2016

(54) POLYMORPH TABLE WITH SHARED COLUMNS

(71) Applicant: International Business Machines Corporation, Armonk, NY (US)

(72) Inventor: Gaetano Ruggiero, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 14/160,228

(22) Filed: Jan. 21, 2014

(65) Prior Publication Data

US 2014/0208063 A1 Jul. 24, 2014

(30) Foreign Application Priority Data

Jan. 22, 2013 (GB) .................................. 1301066.5

(51) Int. Cl.
*G06F 17/30* (2006.01)
*G06F 12/10* (2016.01)

(52) U.S. Cl.
CPC ..... *G06F 12/1036* (2013.01); *G06F 17/30312* (2013.01)

(58) Field of Classification Search
CPC ..................... G06F 17/2247; G06F 17/30286; G06F 17/30005; G06F 17/3012; G06F 17/20091; G06F 17/30067; G06F 17/30292; G06F 17/30315; G06F 17/30333; G06F 17/30339; G06F 17/30342
USPC ....... 707/756, 759, 760, 763, 740, 741, 790, 707/791, 793, 796, 802, 803, 804, 807, 810, 707/812, 831, 811
See application file for complete search history.

(56) References Cited

U.S. PATENT DOCUMENTS 5,991,762 A * 11/1999 Nagarajayya ......... G06F 9/4443
6,411,954 B1 6/2002 Roffe et al.
(Continued)

FOREIGN PATENT DOCUMENTS

JP 2002007177 A 1/2002
JP 2010128893 A 6/2010
(Continued)

OTHER PUBLICATIONS

International Search Report and Written Opinin for International Patent Application No. PCT/IB2014/058247; International Filing Date: Jan. 14, 2014; Date of Mailing: Apr. 1, 2014; 9 pgs.
(Continued)

*Primary Examiner* — Greta Robinson
(74) *Attorney, Agent, or Firm* — Cantor Colburn LLP

(57) ABSTRACT

For managing a database in a data-processing system, a polymorph table and a mapping structure are provided. The polymorph table includes a discrimination column and a total number of columns of each type equal to a maximum of the virtual columns of the type. The mapping structure stores information mapping each virtual column to a polymorph column of the same type. A virtual access request is received based on one of the virtual columns of one of the virtual tables. Selected mapping information is retrieved that maps each selected virtual column to one of the polymorph columns. The virtual access request is converted into a polymorph access request according to an identifier of the selected virtual table and the selected mapping information. The polymorph table is accessed according to the polymorph access request.

20 Claims, 10 Drawing Sheets

(56) References Cited

U.S. PATENT DOCUMENTS

| | | | |
|---|---|---|---|
| 6,694,306 B1 * | 2/2004 | Nishizawa | G06F 17/30457 707/714 |
| 6,694,325 B2 | 2/2004 | Jas | |
| 6,728,727 B2 | 4/2004 | Komine et al. | |
| 6,735,598 B1 * | 5/2004 | Srivastava | G06F 9/44521 707/803 |
| 7,058,646 B1 * | 6/2006 | Loboz | G06F 17/30306 707/803 |
| 7,266,539 B2 | 9/2007 | Berks et al. | |
| 7,725,501 B1 * | 5/2010 | Stillman | G06F 17/30607 707/793 |
| 8,112,459 B2 * | 2/2012 | Dettinger | G06F 17/30427 707/781 |
| 8,180,799 B1 * | 5/2012 | Healy | G06F 17/243 707/791 |
| 8,219,580 B2 | 7/2012 | Bumgarner et al. | |
| 8,768,947 B2 * | 7/2014 | Franz | G06F 17/30436 707/759 |
| 9,081,836 B2 * | 7/2015 | Kolli | G06F 17/30566 |
| 2006/0047723 A1 * | 3/2006 | Pomponio | G06F 17/30286 |
| 2008/0189240 A1 * | 8/2008 | Mullins | G06F 17/30557 |

FOREIGN PATENT DOCUMENTS

| | | |
|---|---|---|
| WO | 02103573 A1 | 12/2002 |
| WO | 2007083371 A | 7/2007 |

OTHER PUBLICATIONS

United Kingdom Intellectual Property Office, Search Report, Application No. GB1301066.5, Jul. 25, 2013, 3 pages.

* cited by examiner

POLYMORPH TABLE WITH SHARED COLUMNS

CROSS REFERENCE TO RELATED APPLICATIONS

This application claims priority to United Kingdom Application No. 1301066.5, filed Jan. 22, 2013, and all the benefits accruing therefrom under 35 U.S.C. §119. The contents of United Kingdom Application No. 1301066.5, in its entirety, are herein incorporated by reference.

BACKGROUND

One or more embodiments of the present invention relate to the data-processing field and, more specifically, to the management of databases.

Databases are commonly used to store large amount of data in a structured form in a data-processing system; particularly, in the case of a database of the relational type, the data is organized in tables (with rows and columns) storing related data. A quite common problem of the databases is the management of heterogeneous data. A typical scenario is the management of data representing different entities that all refer to a single subject.

In this case, the data of each entity is stored into a distinct table (possibly in addition to a table of the data of the subject). However, this causes a proliferation of the tables, which adversely affects the performance of the database.

Alternatively, it is possible to aggregate all the (heterogeneous) data into a single aggregated table. However, this requires a very high number of columns in the aggregated table (for all the heterogeneous data) and this total number of columns of the aggregated table may be more than the number of columns supported.

Most of the databases also support the definition of views on the tables. Generally, a view is a virtual table that represents selected data extracted from one or more tables. The views allow representing the data in different ways, without any substantial overhead of the footprint of the database (since only the definitions of the views, but not the corresponding data, are stored). However, the definition of the views is a complex manual task; in any case, the use of different views to represent heterogeneous data again requires an underlying aggregated table with the same drawbacks pointed out above.

SUMMARY

One embodiment disclosed herein is a method for managing a database in a data-processing system. The method includes providing, for a set of virtual tables, a polymorph table stored in the database and a mapping structure. Each virtual table includes a set of virtual columns, each one of a data type. The polymorph table includes a discrimination column for storing an identifier of the virtual tables and a total number of polymorph columns of each data type equal to a maximum number of the virtual columns of the data type in the virtual tables. The mapping structure stores mapping information mapping each virtual column to a corresponding one of the polymorph columns of the same data type. The method also includes receiving a virtual access request for accessing at least part of the virtual tables. The virtual access request is based on at least a selected one of the virtual columns of at least a selected one of the virtual tables. The method also includes retrieving selected mapping information mapping each selected virtual column to a selected one of the polymorph columns from the mapping structure. The method also includes converting the virtual access request into a polymorph access request for the polymorph table according to the identifier of said at least one selected virtual table and the selected mapping information. The method also includes accessing the polymorph table according to the polymorph access request.

One embodiment disclosed herein is a computer program product for facilitating communication between a client application and a server application. The computer program product includes a computer readable storage medium having computer readable program code embodied therewith. The computer readable program code is executable by a processor for the following functions. One such function executable by the processor is providing, for a set of virtual tables, a polymorph table stored in the database and a mapping structure. Each virtual table includes a set of virtual columns, each one of a data type. The polymorph table includes a discrimination column for storing an identifier of the virtual tables and a total number of polymorph columns of each data type equal to a maximum number of the virtual columns of the data type in the virtual tables. The mapping structure stores mapping information mapping each virtual column to a corresponding one of the polymorph columns of the same data type. Another function executable by the processor is receiving a virtual access request for accessing at least part of the virtual tables. The virtual access request is based on at least a selected one of the virtual columns of at least a selected one of the virtual tables. Another function executable by the processor is retrieving selected mapping information mapping each selected virtual column to a selected one of the polymorph columns from the mapping structure. Another function executable by the processor is converting the virtual access request into a polymorph access request for the polymorph table according to the identifier of said at least one selected virtual table and the selected mapping information. Another function executable by the processor is accessing the polymorph table according to the polymorph access request.

One embodiment disclosed herein is a system including a processor configured to execute a module configured for the following functions. The module is configured for providing, for a set of virtual tables, a polymorph table stored in the database and a mapping structure. Each virtual table includes a set of virtual columns, each one of a data type. The polymorph table includes a discrimination column for storing an identifier of the virtual tables and a total number of polymorph columns of each data type equal to a maximum number of the virtual columns of the data type in the virtual tables. The mapping structure stores mapping information mapping each virtual column to a corresponding one of the polymorph columns of the same data type. The module is configured for receiving a virtual access request for accessing at least part of the virtual tables. The virtual access request is based on at least a selected one of the virtual columns of at least a selected one of the virtual tables. The module is configured for retrieving selected mapping information mapping each selected virtual column to a selected one of the polymorph columns from the mapping structure. The module is configured for converting the virtual access request into a polymorph access request for the polymorph table according to the identifier of said at least one selected virtual table and the selected mapping information. The module is configured for accessing the polymorph table according to the polymorph access request.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
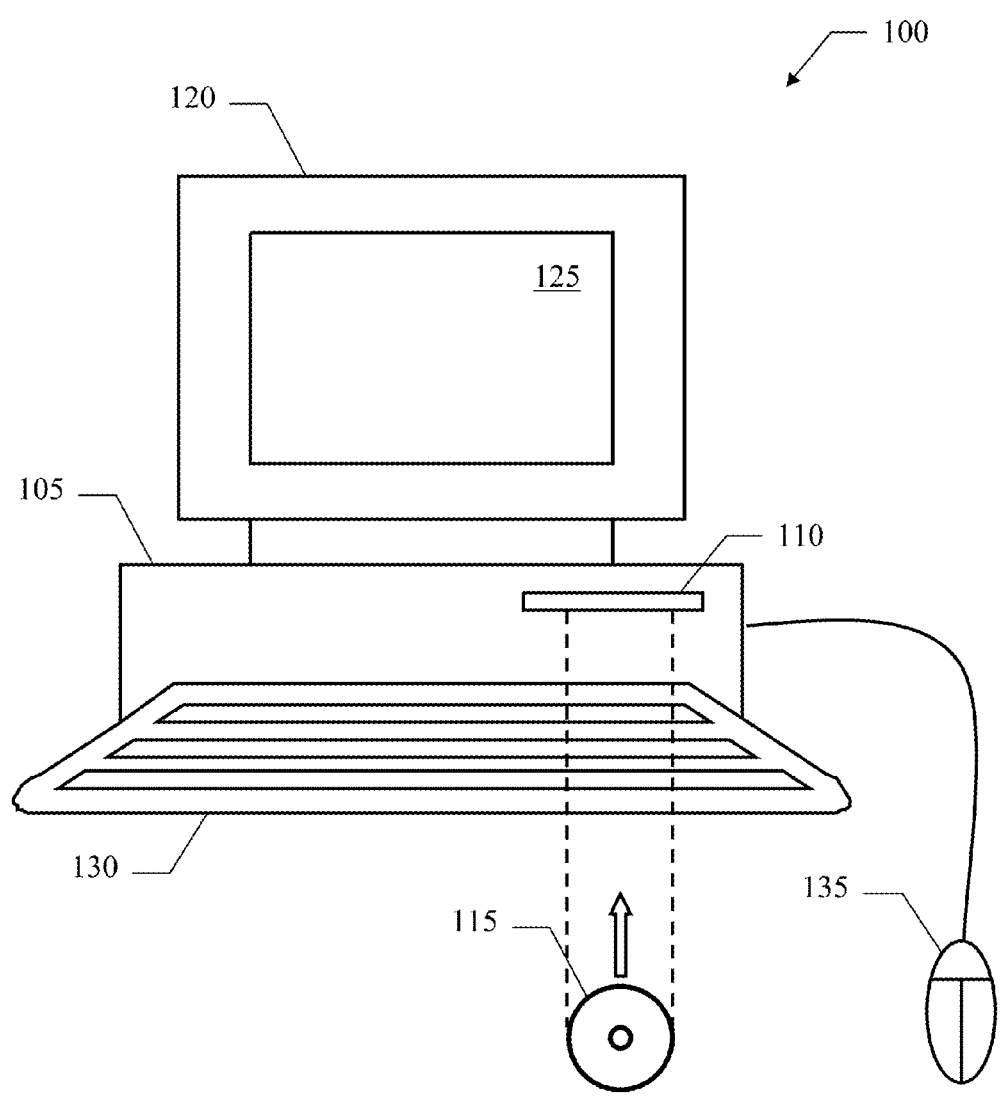
FIG. 1 shows a pictorial representation of a data-processing system that may be used to practice the solution according to an embodiment of the invention.

As noted above, in order to manage different entities that all refer to a single subject, some conventional database implementations store data of each entity into a distinct table. A very simple example of this scenario is a registry of different types of assets (for example, cars, PCs and smart-phones) that are assigned to each employee of a company. A conventional database implement may provide a table for the employees, and three other tables are provided for the cars, the PCs and the smart-phones—with the (child) tables for the cars, the PCs and the smart-phones that reference the (parent) table for the employees. However, these additional tables adversely affects database performance. Indeed, each access to selected data requires a number of distinct accesses to the corresponding tables, with a proportional increase of a total access time; for example, in the scenario at issue, any access to the data of selected assets of selected employees requires an access to the parent table of the employees (to select them) and then an access to the child table of each selected asset (to select its data corresponding to the selected employees).

As also noted above, other conventional database implementations aggregate all the (heterogeneous) data into a single aggregated table. To continue with the same scenario, the data of all the assets (i.e., the cars, the PCs and the smart-phones) is stored into a single child table for all the assets that again references the parent table for the employees. In this way, the performance of the database increases, since each access to selected data now only requires a single access to the aggregated table (with a corresponding reduction of the total access time); for example, in this scenario any access to the data of selected assets of selected employees requires an access to the parent table of the employees (to select them) and then an access to the child table (to select its data for the selected assets corresponding to the selected employees).

However, a single aggregated table may lead to an overflow condition, since the total number of columns of the aggregated table tends to exceed the one that is supported. Moreover, only a small part of the aggregated table is actually used; indeed, in each row only some of the columns store the data of the corresponding child table, whereas the other columns remain empty. This causes a significant increase of a footprint of the database. Moreover, governance tasks become more complex; for example, the addition of the data of any new child table always requires modifying the aggregated table with the addition of corresponding new columns (which may involve long operations for exporting the data, adding the new columns, and then re-importing the data). In any case, the large size of the aggregated table adversely affects the performance of the database, since the access time of the aggregated table increases with the number of its columns.

The solution according to one or more embodiments of the present invention is based in the idea of sharing columns of a polymorph table. More specifically, an aspect provides a method for managing a database, wherein a polymorph table stored in the database with a total number of polymorph columns of each data type equal to a maximum number of virtual columns of the data type in each one of a set of virtual tables, and a mapping structure is provided storing mapping information that maps each virtual column to a corresponding one of the polymorph columns of the same data type.

With reference in particular to the FIG. 1, a pictorial representation is shown of a data-processing system 100 that may be used to practice the solution according to an embodiment of the invention.

The data-processing system 100 (for example, a PC) is formed by a central unit 105, which houses the electronic circuits controlling its operation; typically, these electronic circuits comprise a microprocessor, a working memory, drives for input/output units, a wireless network adapter (for example, of the Wi-Fi type), and the like. The data-processing system 100 is also provided with a hard disk and a drive 110 for reading optical disks 115 (for example, CDs or DVDs). A monitor 120 is used to display images on a screen 125. Operation of the data-processing system 100 is controlled by means of a keyboard 130 and a mouse 135, which are connected to the central unit 105 in a conventional manner.

The data-processing system 100 may be used to manage data stored in a relational database.

Generally speaking, a database is a collection of data that is logically structured so as to allow its management (i.e., manipulation and extraction); particularly, in a database of the relational type, the data is structured according to the relational model. For this purpose, the data is structured in tables (defining relations of the relational model).

Each table has a set of rows and columns Each row (defining a tuple of the relational model) stores a record, i.e., a set of related data. Each column (defining an attribute of the relational model) identifies a corresponding field of each record, i.e., a single piece of data; more specifically, the column identifies a name (unique in the table) and a data type, i.e., its possible values (defining a domain of the relational model); for example, the data type may be a character, a string, an integer, a floating-point number, a Boolean, and the like. Generally, the table has a primary key that uniquely identifies its records; the primary key is formed by a dedicated column (or more) whose fields have unique values in the table. The table may also have one or more foreign keys that cross-reference other tables; each foreign key of a table (called child table) is formed by a column (or more) referencing the primary key of another table (called parent table)—with the value of the foreign key in each record of the child table that identifies a single record of the parent table having the value of the primary key equal thereto.

Statements may be executed on the database for managing it. Particularly, (definition) statements in a Data Definition Language (DDL), for example, the Structured Query Language (SQL), are used to modify a schema of the database that defines its structure (for example, the tables of the database with the columns thereof, and their cross-references). Moreover, (manipulation) statements in a Data Manipulation Language (DML), for example, again the SQL, are used to modify the data stored in the database (for example, by inserting, removing and updating it). On the other hand, queries in a Query Language, for example, again the SQL, are used to retrieve data from the database. Generally, each SQL statement or query comprises a clause that specifies one or more selected columns of one or more selected tables to be accessed (identified by their names); the SQL statement or query may also comprise a predicate (in the form of a WHERE clause), which specifies conditions restricting the records (with selected fields corresponding to the selected columns) that are selected.

Figure 2A:
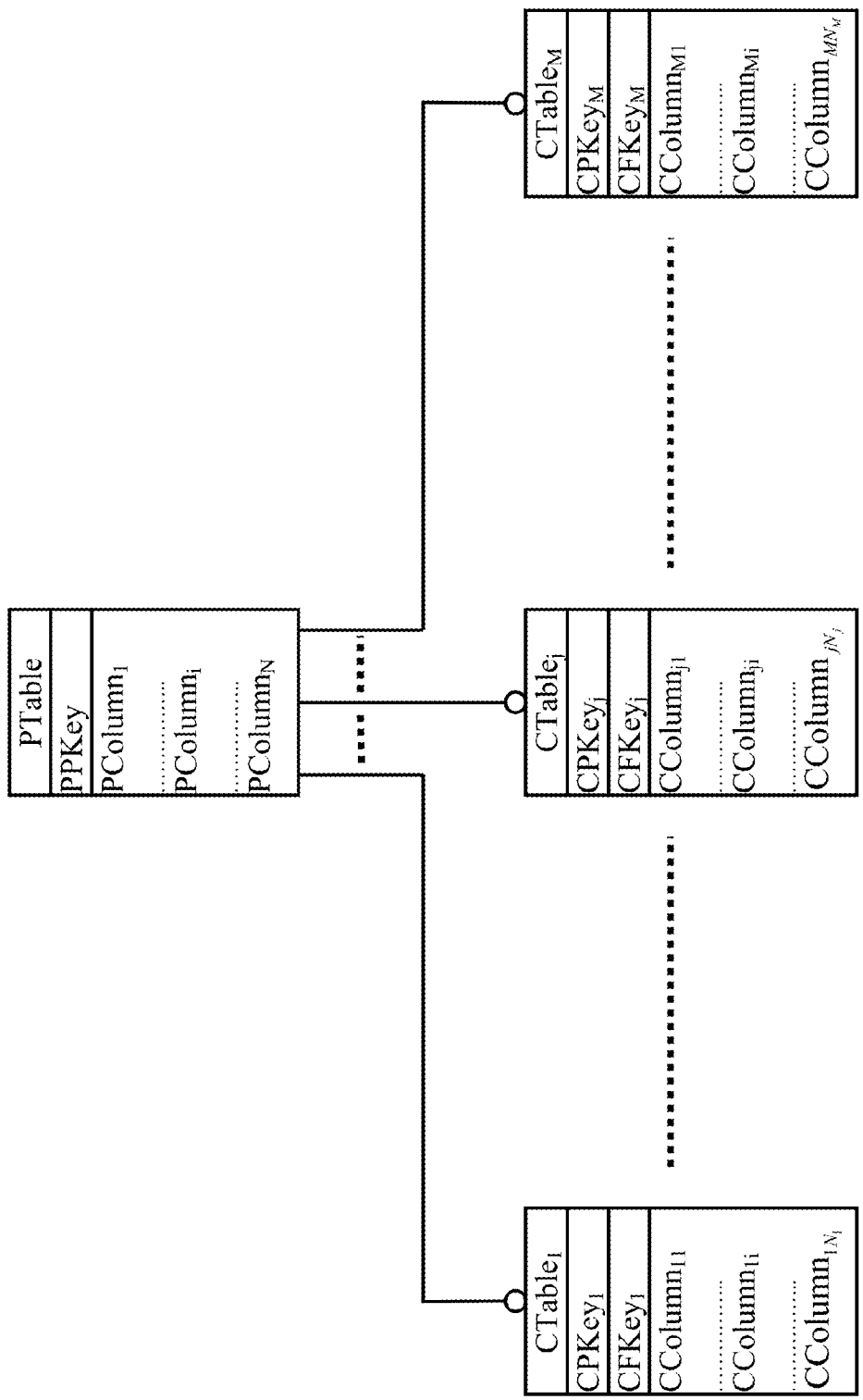
FIG. 2A-FIG. 2B show an example of database organization known in the art.
Figure 2B:
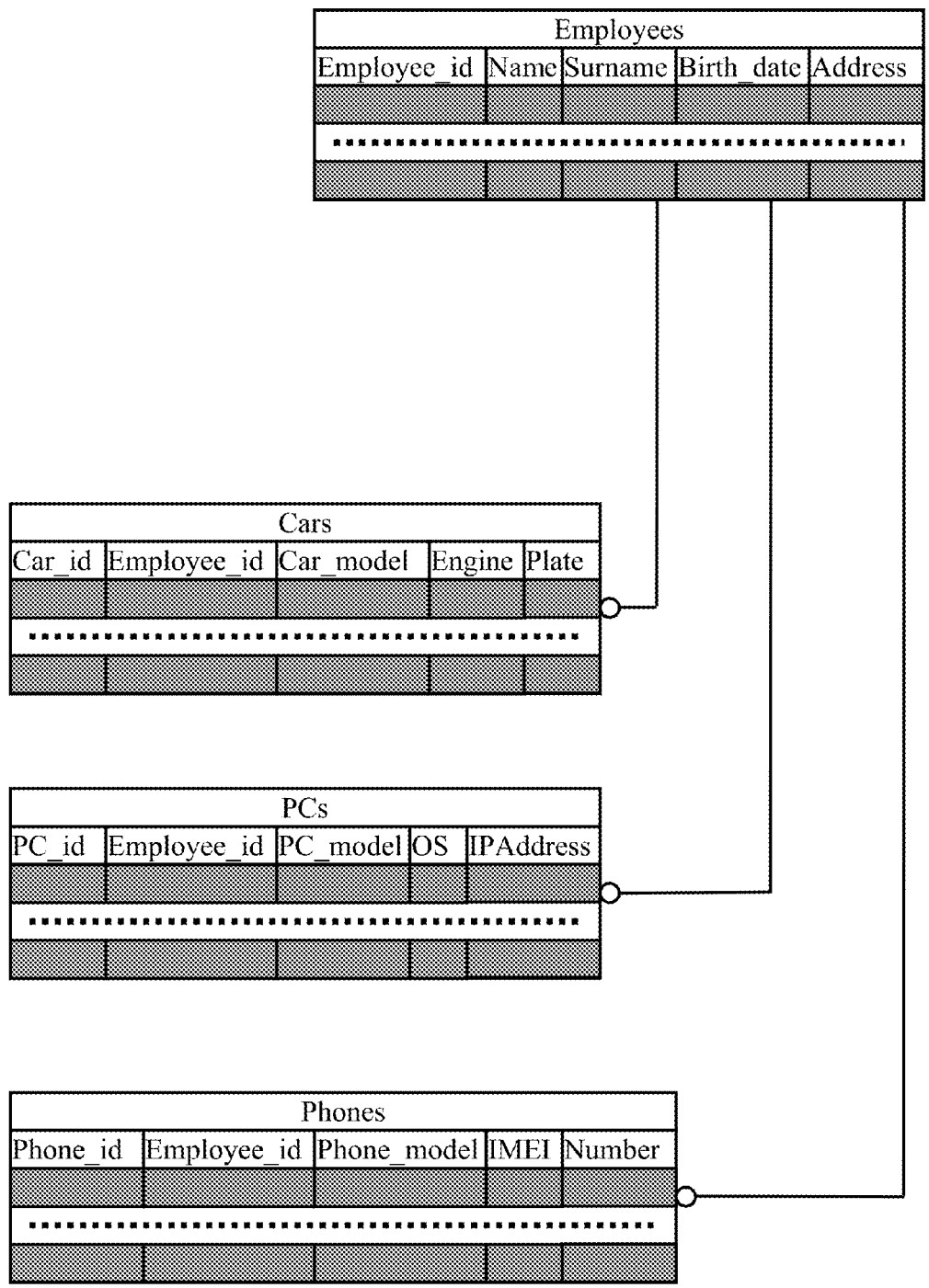

An example of database organization known in the art is shown in the FIG. 2A-FIG. 2B.

Starting from the FIG. 2A, the schema comprises a parent table PTable; the parent table PTable has a column defining its primary key PPKey and a set of other columns $PColumn_i$ (with i=1 . . . N). The parent table PTable is referenced by a set of child tables $CTable_j$ (with j=1 . . . M); each child table $CTable_j$ has a column defining its primary key $CPKey_j$, a column defining a foreign $CFKey_j$ that references the primary key PPKey of the parent table PTable, and a set of other columns $PColumn_{ji}$ (with i=1 . . . $N_j$).

In this case, each access to selected columns of selected child tables $CTable_j$ relating to selected records of the parent table PTable (for running either a manipulation statement or a query) requires an access to the parent table PTable (to select the desired records thereof) and then an access to each one of the selected child tables $CTable_j$ (to select the desired columns corresponding to the selected records of the parent table PTable). Therefore, a total access time $CΔt_{toj}$ (in the worst case wherein all the M child tables $CTable_j$ are selected) is:

$$CΔt_{tot} = Δtp + \sum_{j=1}^{M} Δtc_j,$$

wherein $Δtp$ is an access time of the parent table PTable and $Δtc_j$ is an access time of each child table $CTable_j$.

Moving to the FIG. 2B, in an example of database implementing the above-described schema (wherein the data is generically represented with gray boxes), the parent table (Employees) stores a registry of employees of a company. In this case, the primary key (Employee_id) stores a personal code that uniquely identifies each employee, and the other columns store personal information of each employee (for example, Name, Surname, Birth_date and Address). The child tables store heterogeneous data relating to different types of assets assigned to the employees. For this purpose, each child table stores a registry of the corresponding assets (for example, Cars, PCs and Phones). In this case, the primary key (Car_id, PC_id and Phone_id, respectively) stores a serial number that uniquely identifies each asset, the foreign key (Employee_id) stores the personal code of the employee having each asset assigned to, and the other columns store specific information of each asset; for example, the child table Cars has the columns Car_model, Engine and Plate, the child table PCs has the columns PC_model, OS and IPAddress, and the child table Phones has the columns Phone_model, IMEI and Number.

Figure 3A:
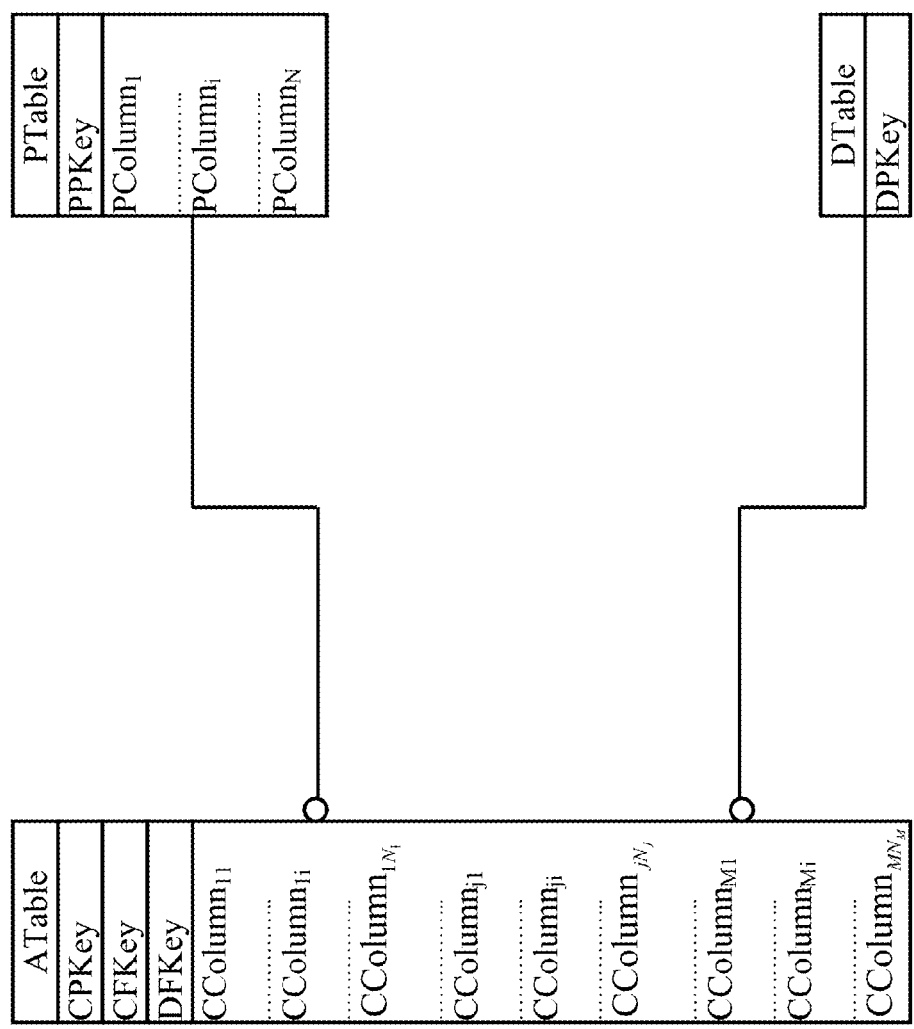
FIG. 3A-FIG. 3B show another example of database organization known in the art.
Figure 3B:
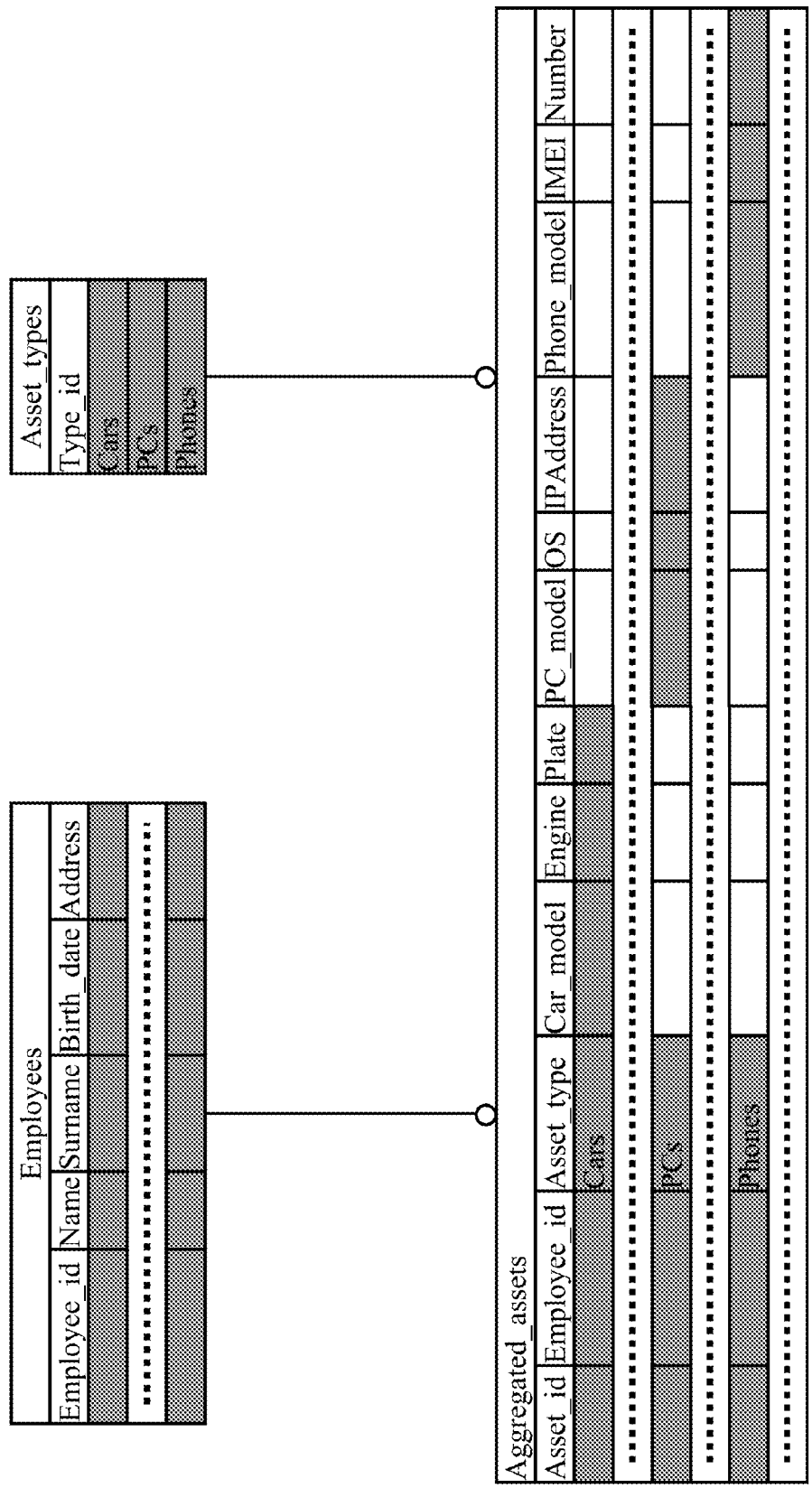

Another example of database organization known in the art is shown in the FIG. 3A-FIG. 3B.

Starting from the FIG. 3A, in the schema all the child tables $CTable_j$ of the previous case are now aggregated into a single child table (referred to as aggregated table) ATable, with the addition of a discrimination table DTable. The discrimination table DTable has a single column defining its primary key DPKey for a unique identifier of the child tables $CTable_j$ (for example, their name). The aggregated table ATable has a column defining its primary key CPKey (for the primary keys $CPKey_j$ of all the child tables $CTable_j$, assumed to be of the same data type) and a column defining a foreign key CFKey (which again references the primary key PPKey of the parent table PTable). In this case, the aggregated table ATable has a column defining a further foreign key DFKey that references the primary key DPKey of the discrimination table DTable; the aggregated table ATable then has a set of other columns for the columns $CColumn_{ji}$ of all the child tables $CTable_j$ (denoted with the same references).

In this case, each access to selected columns of the aggregated table ATable relating to selected records of the parent table PTable only requires an access to the parent table PTable (to select the desired records thereof) and an access to the aggregated table ATable (to select the desired columns in it corresponding to the selected records of the parent table PTable). Therefore, a total access time $AΔt_{tot}$ is:

$$AΔt_{tot} = Δtp + Δta,$$

wherein $Δta$ is an access time of the aggregated table ATable.

However, the total number of columns of the aggregated table ATable (AN) is now equal to the sum of the total number of columns $CColumn_{ji}$ of all the child tables $CTable_j$:

$$AN = \sum_{j=1}^{M} Nj.$$

Moving to the FIG. 3B, in an example of database implementing the above-described schema (wherein the data is again generically represented with gray boxes), the parent table Employees is the same as above. The discrimination table (Asset_types) stores a list of the types of assets that may be assigned to the employees; for this purpose, the primary key (Type_id) stores an asset code that uniquely identify each asset type (for example, Cars, PCs and Phones). The aggregated table (Aggregated_assets) now stores a single registry with the data relating to all the assets (of any asset type) assigned to the employees. As above, the foreign key Employee_id stores the personal code of the employee having each asset assigned to. On the other hand, the primary key (Asset_id) stores the serial number that uniquely identifies each asset (i.e., car, PC or phone), the further foreign key (Asset_type) stores the corresponding asset type, and the other columns store the specific information of each asset (for any asset type); more specifically, the columns Car_model, Engine and Plate store the specific information for the cars, the columns PC_model, OS and IPAddress store the specific information for the PCs, and the columns Phone_model, IMEI and Number store the specific information for the phones. Therefore, in each row of the aggregated table Aggregated_assets only the fields of the corresponding asset type stores data, whereas all the other fields are empty (as represented with white boxes).

Figure 4A:
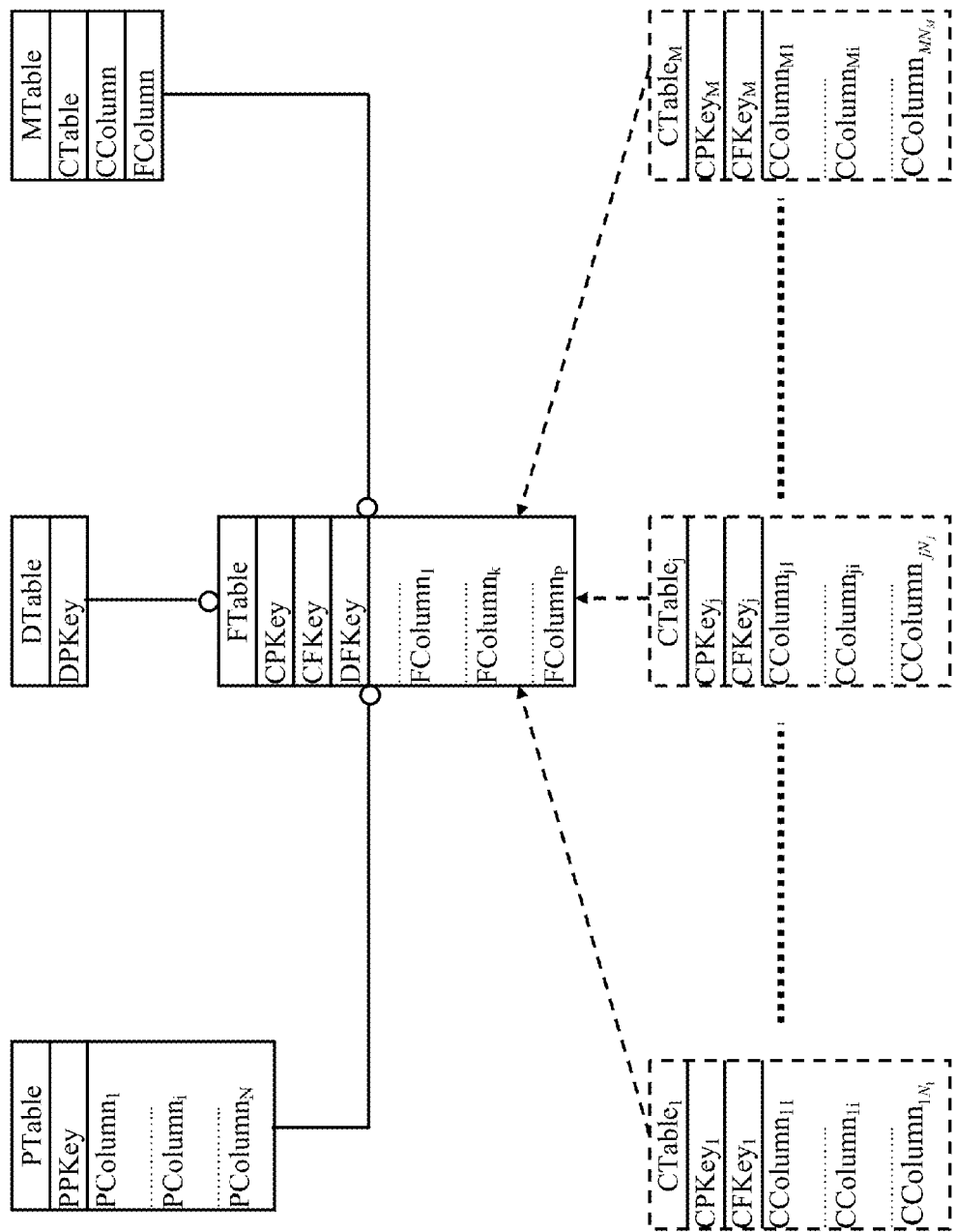
FIG. 4A-FIG. 4B show an example of database organization according to an embodiment of the invention.
Figure 4B:
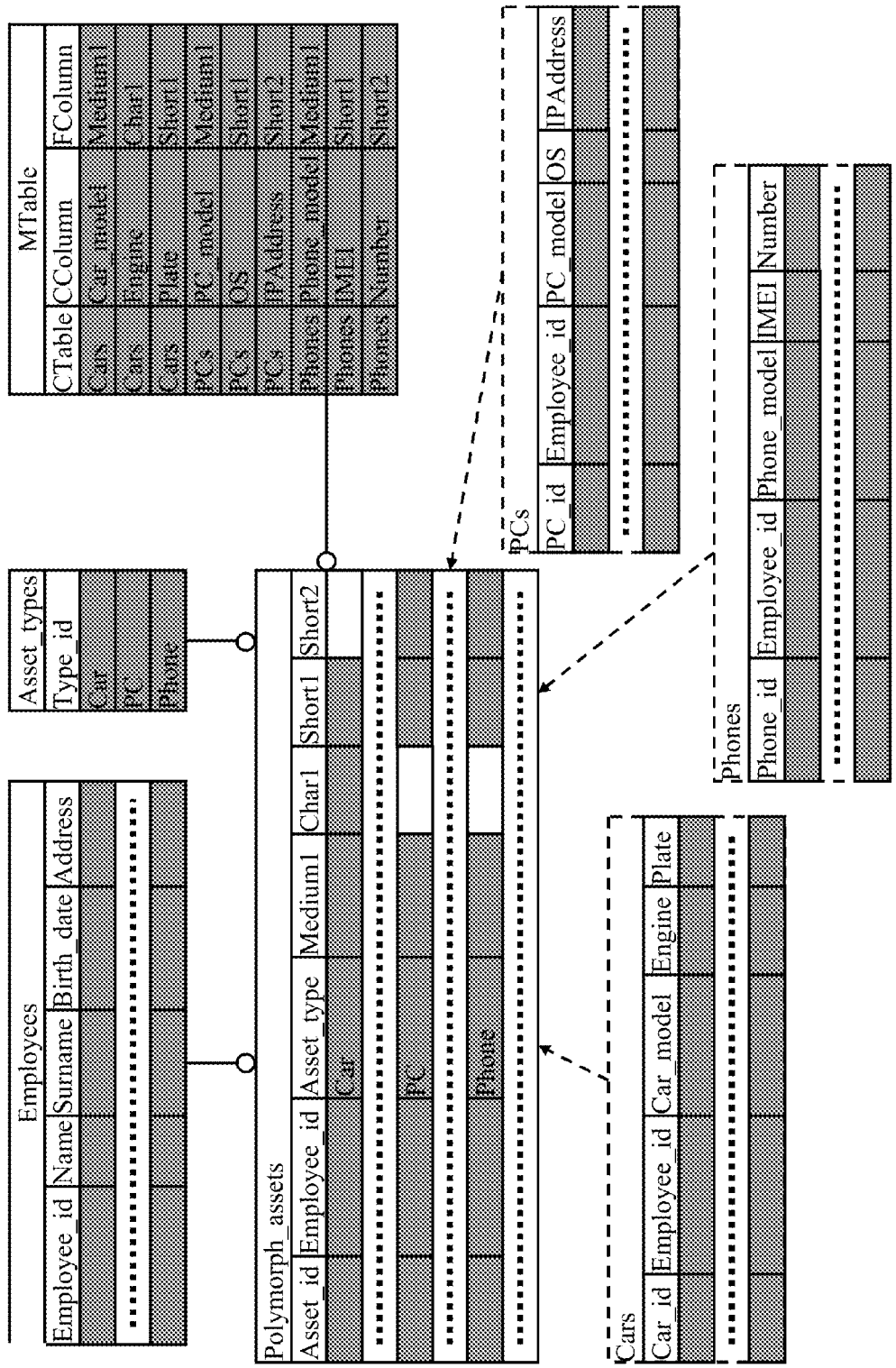

An example of database organization according to an embodiment of the invention is instead shown in the FIG. 4A-FIG. 4B.

Starting from the FIG. 4A, in the schema all the child tables CTable$_i$ are again aggregated into a single child table (now referred to as polymorph table) FTable, with the addition of the same discrimination table DTable and a mapping table MTable. A virtual table with the same virtual columns of each child table (denoted with the same references) is now emulated from the polymorph table FTable according to the mapping table MTable.

For this purpose, the discrimination table DTable is the same as above.

Moreover, in this case as well the polymorph table FTable has the primary key CPKey (for the primary keys CPKey$_j$ of all the virtual tables CTable$_j$, assumed to be of the same data type), the foreign key CFKey that references the primary key PPKey of the parent table PTable, and the foreign key DFKey that references the primary key DPKey of the discrimination table DTable. However, the polymorph table FTable now has a compressed set of columns (referred to as polymorph columns) that are shared among the virtual columns CColumn$_{ji}$ of all the virtual tables CTable$_j$. More specifically, for each data type DT$_k$ (with k=1 . . . P) the polymorph table FTable has a total number of polymorph columns FColumn$_k$ equal to a maximum number of the virtual columns CColumn$_{ji}$ of the same data type DT$_k$ in all the virtual tables CTable$_j$.

The mapping table MTable has a pair of columns CTable and CColumn defining its primary key for a unique identifier of the virtual columns CColumn$_{ji}$ of all the virtual tables CTable$_j$; this unique identifier is defined by the name of the virtual table CTable$_j$ (in the column CTable) and the name of the virtual column CColumn$_{ji}$ (in the column CColumn). The mapping table MTable has a single further column FColumn for the name of the polymorph column FColumn$_k$ that maps the virtual column CColumn$_{ji}$.

In this way, the data of each virtual column CColumn$_{ji}$ is stored in the corresponding polymorph column FColumn$_k$; the semantic of the data (being lost in the polymorph table FTable because of the sharing of the polymorph columns FColumn$_k$ among all the virtual tables CTable$_j$) is restored according to the mapping table MTable.

Therefore, the total number of polymorph columns (FP) is now equal to:

$$FP = \sum_{k=1}^{P} X_k,$$

wherein X$_k$ is the maximum number of the virtual columns CColumn$_{ji}$ of the data type DT$_k$ in all the virtual tables CTable$_j$.

The above-described solution allows reducing the number of polymorph columns (for the same heterogeneous data). This makes far more difficult the occurrence of any overflow condition (since it is very unlike that the total number of polymorph columns would exceed the one that is supported). Moreover, most of the polymorph table is now actually used; indeed, in each row many polymorph columns are now shared among multiple virtual tables, so as to store the corresponding data alternatively. This causes a significant reduction of a footprint of the database. Moreover, governance tasks become easier; for example, very often the addition of the data of any new virtual table does not require modifying the polymorph table (since the available polymorph columns may generally be used to map the corresponding new virtual columns, without the need of adding any new polymorph columns).

In this case as well, each access to selected virtual columns CColumn$_{ji}$ relating to selected records of the parent table PTable only requires an access to the parent table PTable (to select the desired records thereof) and an access to the polymorph table FTable (to select the desired polymorph columns FColumn$_k$ in it corresponding to the selected records of the parent table PTable). Therefore, a total access time FΔt$_{tot}$ is:

$$F\Delta t_{tot} = \Delta tp + \Delta tf,$$

wherein Δtf is an access time of the polymorph table FTable. However, the access time Δtf of the polymorph table FTable is now lower than the access time Ata of the above-described aggregated ATable, because the number of polymorph columns FP is lower than the number of columns AP of the aggregated table ATable.

All of the above may be achieved substantially in an automatic way (with no or minimal manual interventions for the allocation of the polymorph table and the mapping of the virtual tables thereto).

Moving to the FIG. 4B, in an example of database implementing the above-described schema (wherein the data is again generically represented with gray boxes), the parent table Employees and the discrimination table DTable are the same as above. In this case as well, the polymorph table (Polymorph_assets) stores a single registry with the heterogeneous data relating to all the assets (of any asset type) assigned to the employees, with the same primary key Asset_id and foreign keys Employee_id and Asset_type. However, assuming that the virtual columns of the virtual tables emulating the child tables Cars, PCs and Phones are of the following data types:

Cars
  Car_model: medium_string
  Engine: character
  Plate: short_string
PCs
  PC_model: medium_string
  OS: short_string
  IPAddress: short_string
Phones
  Phone_model: medium_string
  IMEI: short_string
  Number: short_string, the polymorph columns of the polymorph table Polymorph_assets (storing the specific data of each asset, for any asset type) will be one polymorph column Medium1 for the virtual columns of the medium_string type (i.e., the virtual column Car_model of the virtual table Cars, the virtual column PC_model of the virtual table PCs and the virtual column Phone_model of the virtual table Phones), one polymorph column Char1 for the virtual columns of the character type (i.e., the virtual column Engine of the virtual table Cars) and two polymorph columns Short1 and Short2 for the virtual columns of the short_string type (i.e., the virtual column Plate of the virtual table Cars, the virtual columns OS and IPAddress of the virtual table PCs and the virtual columns IMEI and Number of the virtual table Phones). The mapping table MTable maps each one of the above-mentioned virtual columns of the virtual tables Cars, PCs and Phones to one of the above-mentioned polymorph columns of the polymorph table Polymorph_assets that stores the corresponding data.

Therefore, in each row of the polymorph table Polymorph_assets a reduced number of fields are empty (as represented with white boxes). Particularly, only the fields of the polymorph column Short2 are empty in the records of the virtual table Cars, only the fields of the polymorph column Chart are empty in the records of the virtual table PCs, and only the fields of the polymorph column Chart are empty in the records of the virtual table Phones.

Figure 5:
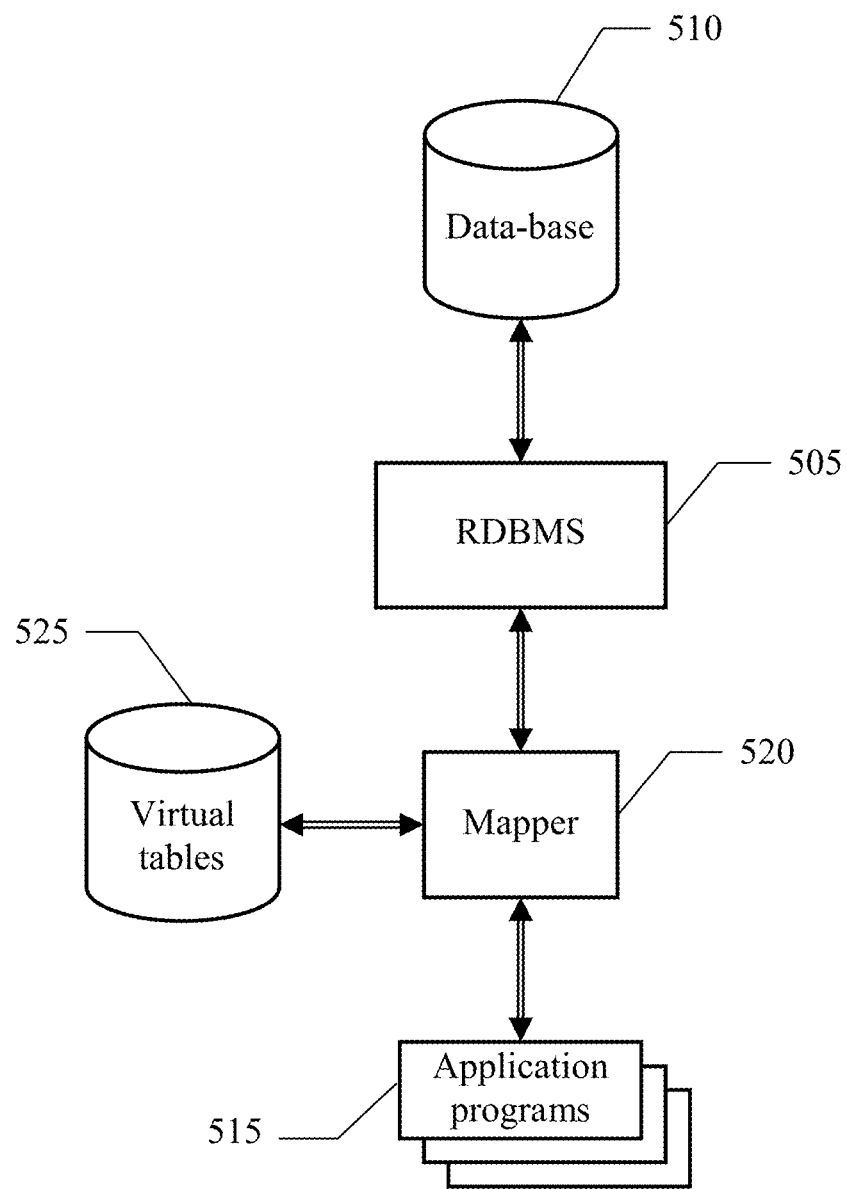
FIG. 5 shows the main software components that may be used to implement the solution according to an embodiment of the invention.

The main software components that may be used to implement the solution according to an embodiment of the invention are shown in the FIG. 5.

The information (programs and data) is typically stored on the hard disk and loaded (at least partially) into the working memory of the data-processing system when the programs are running, together with an operating system and other application programs (not shown in the figure). The programs are initially installed onto the hard disk, for example, from optical disks. In this respect, each component may represent a module, segment or portion of code, which comprises one or more executable instructions for implementing the specified logical function (or more).

Particularly, a Relational Database Management System (or RDBMS) 505 manages a database 510 (or more). The RDBMS 505 provides a logical view of the database 510 in terms of its tables (hiding an underlying implementation thereof). The RDBMS 505 allows performing a number of management operations on the database 510. For example, the RDBMS 505 comprises a data definition sub-system that allows running definition statements for modifying a schema of the database 510, a data manipulation subsystem that allows running manipulation statements for modifying the data stored in the database 510, a query subsystem that allows running queries for retrieving data from the database 510 and properly outputting it (for example, in reports or graphs), an application subsystem that provides development facilities (for example, support for creating and executing scripts automating complex tasks, or for creating graphical user interfaces), and an administration subsystem that provides system facilities (for example, security control, log tracking, backup and recovery, optimization, transaction commit and roll-back, and the like).

One or more application programs 515 interact with the RDBMS 505 for accessing the database 510 (and particularly for modifying its schema, modifying its data and/or extracting it). Typical examples of the application programs 515 are account, warehouse, purchasing and sale application programs (either of the batch type or of the interactive type).

In the solution according to an embodiment of the invention, a mapper 520 bridges between the application programs 515 and the RDBMS 505. Particularly, for each set of related child tables, the mapper 520 emulates corresponding virtual tables that are stored transiently into a working structure 525; the corresponding data is instead persisted into the database 510 by a corresponding polymorph table with its discrimination table and mapping table.

Figure 6A:
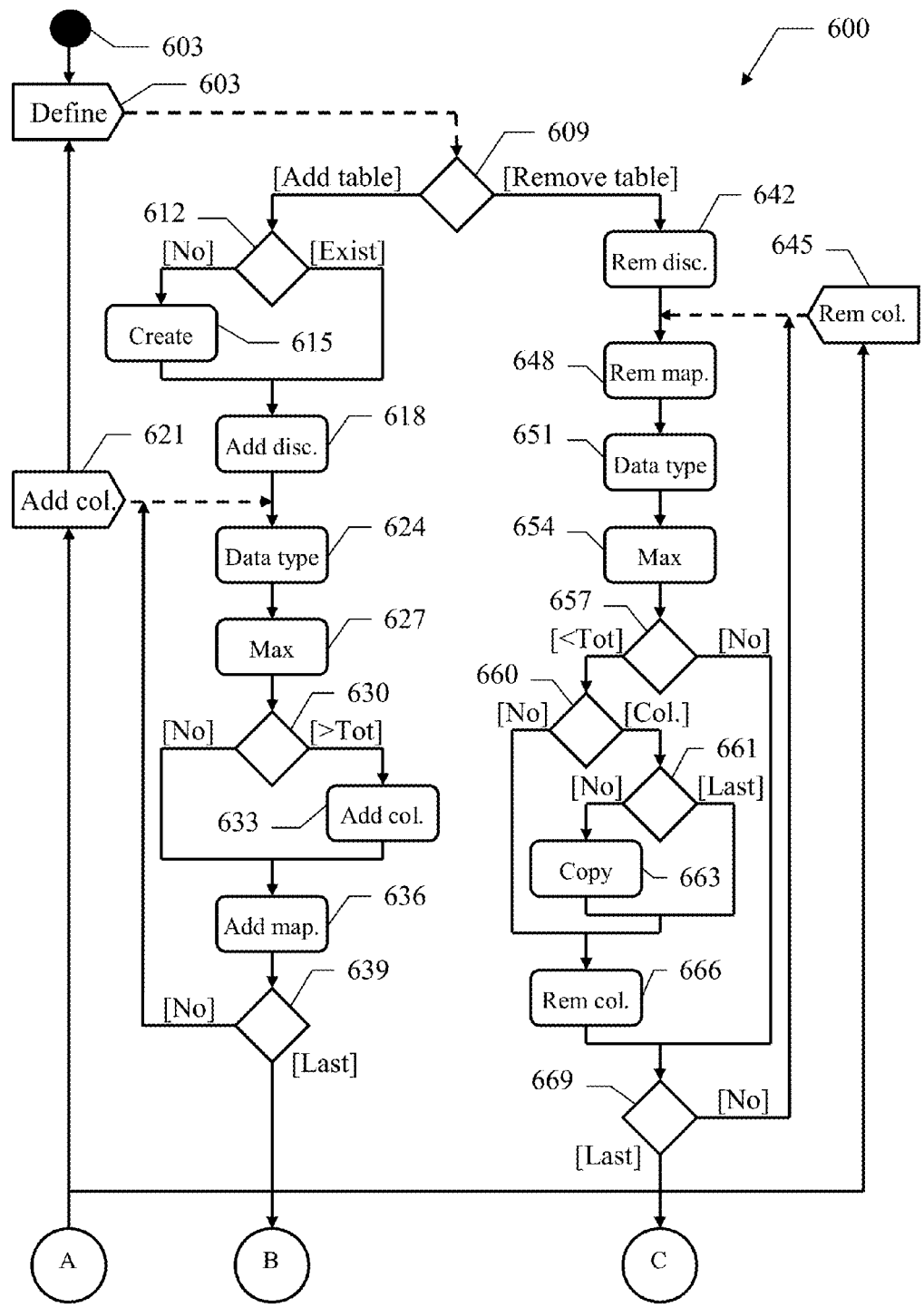
FIG. 6A-FIG. 6B show an activity diagram describing the flow of activities relating to an implementation of the solution according to an embodiment of the invention.
Figure 6B:
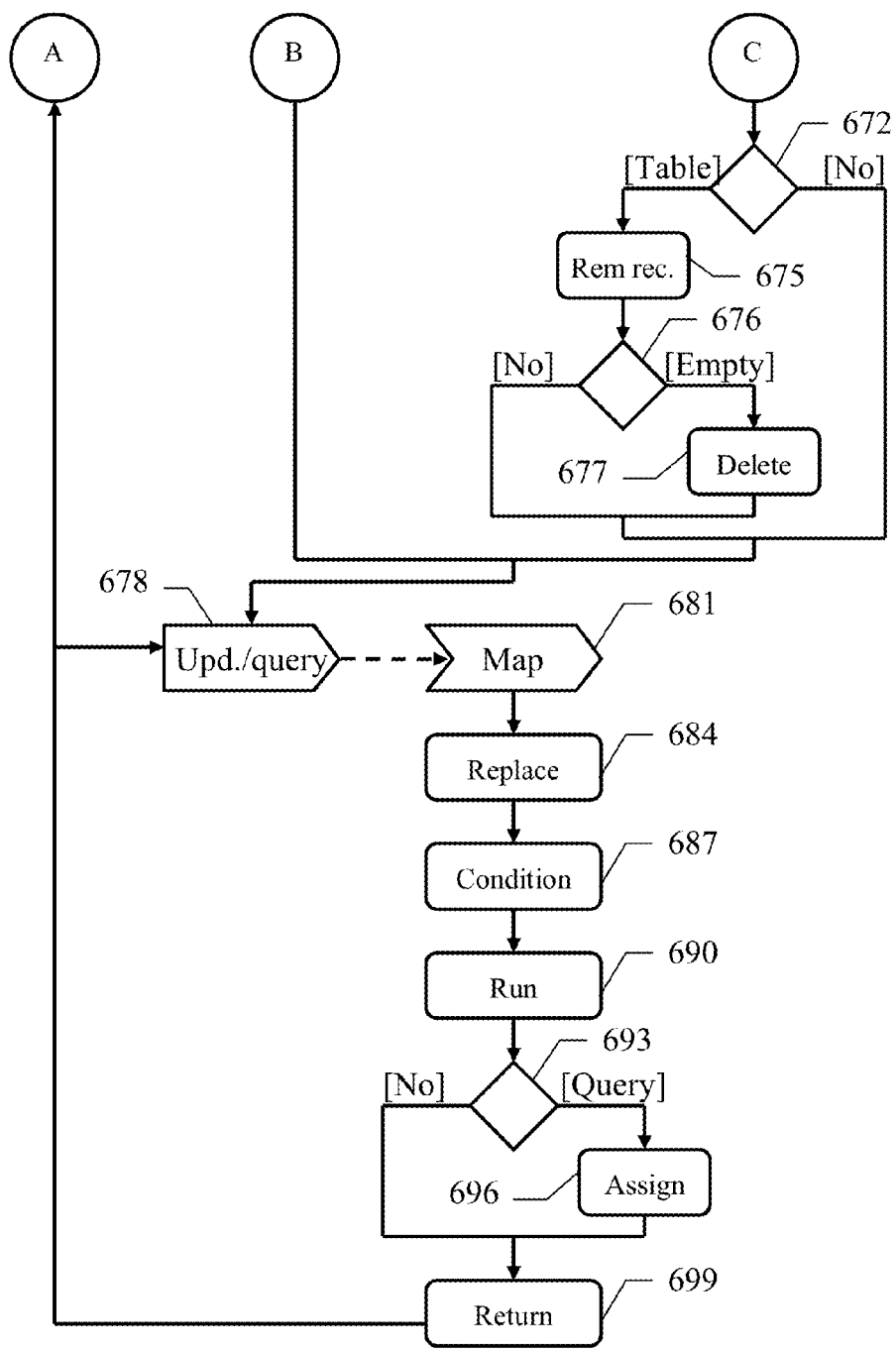

An activity diagram describing the flow of activities relating to an implementation of the solution according to an embodiment of the invention is shown in the FIG. 6A-FIG. 6B.

The diagram represents an exemplary process that may be used to manage a database with a method 600. The method 600 begins at the black start circle 603 and then passes to block 606 as soon as a definition statement is submitted (for example, by an application program for the RDBMS); the definition statement is intercepted by the mapper (for example, with hooking techniques). In response thereto, the flow of activity branches at block 609 according to the type of definition statement.

Particularly, if the definition statement is a request for adding a new virtual table, or more (for example, to a set of virtual tables all having a primary key of the same data type and a foreign key referencing a primary key of a same parent table) the blocks 612-639 are executed, whereas if the definition statement is a request for removing an old virtual table, or more (for example, from the same set of virtual tables) the blocks 642-675 are executed; in both case, the flow of activity merges again at block 678.

With reference in particular to the block 612 (new virtual table addition), a test is made to verify whether the corresponding polymorph table exists. If not, the polymorph table with its discrimination table and mapping table are created at block 615. The discrimination table and the mapping tables have fixed schemas, with the discrimination table that only comprises the column of its primary key (for the name of the virtual tables) and the mapping table that comprises the two columns of its primary key (for the names of the virtual tables and of their virtual columns, respectively), and the column for the names of the corresponding polymorph columns. At the beginning, the polymorph table only comprises the column of its primary key (of the same type as the primary key of the new virtual table), the column of its foreign key referencing the parent table (of the same type as its primary key), and the column of its foreign key referencing the discrimination table (of the same type as its primary key). The flow of activity then passes to block 618; the same point is also reached directly from the block 612 when the polymorph table (with its discrimination table and mapping table) already exists. In both cases, a new record for the name of the new virtual table is added to the discrimination table.

A loop is then performed for each new virtual column of the new virtual table (starting from the first one); the same operations are also performed in response to a further definition statement for adding one or more new virtual columns to a selected virtual table already defined that is submitted at block 621 (and it is intercepted as above).

The loop begins at block 624, wherein the data type of the (current) new virtual column is determined (hereinafter, referred to as new data type). Continuing to block 627, the maximum number of the virtual columns of the new data type in each virtual table (including the new virtual table or the selected virtual table with the addition of the new virtual column) is determined. This maximum number is compared at block 630 with the total number of the polymorph columns of the new data table. If the maximum number is higher than the total number (meaning that the addition of the new virtual column increases the maximum number), the flow of activity descends into block 633. In this phase, a new polymorph column of the new data type is added to the polymorph table (for mapping the new virtual column). The new polymorph column is assigned a name equal to the name of the new data type plus a progressive number; the progressive number is obtained by incrementing by 1 the highest progressive number of the names comprising the name of the new data type in the polymorph columns already existing—with this highest progressive number that is set to 0 when no polymorph column comprising the name of the new data type exists yet.

The flow of activity then continues to block 636; the same point is also reached directly from the block 630 when the maximum number remains equal to the total number (meaning that the addition of the new virtual column does not increase the maximum number, so that the existing polymorph columns of the new data type are enough to map the new virtual column). In both cases, a new record is added to the mapping table; the new record stores the name of the (new or selected) virtual table and the name of the new virtual column in the fields of its primary key, and the name of a corresponding polymorph column in its other field; the name of this polymorph column is equal to the name of the new data type plus the progressive number that is obtained by incrementing by 1 the highest progressive number in the names of the polymorph columns comprising the name of the new data type, which are stored in the records of the new or selected virtual table in the mapping table (i.e., storing its name in the first column of the primary key)—with this highest progressive number that is set to 0 if none is found. In this way, the new virtual column is mapped to the first polymorph column of the new data type that is available (i.e., the one with the lowest progressive number).

A test is made at block 639 to verify whether the last new virtual column has been processed. If not, the method returns to the block 624 to repeat the same operations on a next new virtual column Conversely (once all the new virtual columns have been added), the loop is exit by descending into block 678.

For example, referring back to the database of the FIG. 4B, the addition of a new virtual table Programs with three new virtual columns Name, Version and Level (in addition to a primary key Program_id and the foreign key Employee_id), all of them of the short_string data type, may be requested by submitting the following definition statement (intercepted by the mapper):

CREATE VIRTUAL TABLE Programs ON Polymorph_assets
  Program_id short_string;
  Employee_id short_string;
  Name short_string;
  Version short_string;
  Level short_string);

The addition of the new virtual column Name and Version does not require the addition of any new polymorph column, since they may already be mapped to the two polymorph columns of the short_string type already existing, i.e., Short1 and Short2, respectively. Conversely, the addition of the new virtual column Level requires the addition of a new polymorph column with the name Short3. Therefore, the addition of the new virtual table Programs is implemented by the mapper submitting the following definition statement and manipulation statement to the RDBMS:

ALTER TABLE Polymorph_assets ADD Short3 short_string;
INSERT TABLE MTable (CTable, CColumn, FColumn)
VALUES ("Programs", "Name", "Short1")
VALUES ("Programs", "Version", "Short2")
VALUES ("Programs", "Level", "Short3");

With reference now to the block 642 (old virtual table removal), the record with the name of the old virtual table is removed from the discrimination table. A loop is then performed for each old virtual column of the old virtual table (starting from the first one); the same operations are also performed in response to a further definition statement for removing one or more old virtual columns from a (further) selected virtual table that is submitted at block 645 (and it is intercepted as above).

The loop begins at block 648, wherein the record of the mapping table that stores the name of the old or selected virtual table and the name of the (current) old virtual column in the fields of its primary key is removed, so as to delete its mapping to the corresponding polymorph column indicated in the other field thereof (hereinafter, referred to as old polymorph column). The data type of the old virtual column (hereinafter, referred to as old data type) is determined at block 651. Continuing to block 654, the maximum number of the virtual columns of the old data type in each virtual table (including the old virtual table or the selected virtual table without the old virtual column) is determined. This maximum number is compared at block 657 with the total number of the polymorph columns of the old data table. If the maximum number is lower than the total number (meaning that the removal of the old virtual column reduces the maximum number), the flow of activity descends into block 660. The flow of activity then branches according to the type of the definition statement. Particularly, if the definition statement is for removing the old virtual column only (leaving the selected virtual table), a further test is made at block 661 to verify whether the old polymorph column is the last one of the old data type (i.e., it comprises the highest progressive number in all the names of the polymorph columns comprising the name of the old data type). If not, the flow of activity descends into block 663, wherein in each record of the polymorph table, whose field in the discrimination column stores the identifier of the selected virtual table, the field in the last polymorph column is copied (either leaving it or not therein) into the field of the old polymorph column (so as to preserve them, as described in the following). The flow of activity then continues to block 666; the same point is also reached directly from the block 660 (if the definition statement is for removing the old virtual table) or from the block 661 (if the old polymorph column is the last one). In any case, the old polymorph column is removed from the polymorph table. In this way, the operation does not cause any loss of data. Indeed, in the case of the removal of the old virtual table all its content is to be removed at the end; conversely, in the case of the removal of the old virtual column of the selected virtual table only, the data is to be removed if the old virtual column is the last one, whereas it has been previously saved otherwise.

The flow of activity merges at block 669 from the block 666 or from the block 657 when the maximum number remains equal to the total number (meaning that the removal of the old virtual column does not reduce the maximum number, so that all the polymorph columns of the old data type are still required to map the remaining virtual columns). A test is now made to verify whether the last old virtual column has been processed. If not, the method returns to the block 648 to repeat the same operations on a next old virtual column.

Conversely (once all the old virtual columns have been removed), the loop is exit by descending into block 672. At this point, the flow of activity again branches according to the type of the definition statement. Particularly, if the definition statement is for removing the old virtual table, at block 675 each record of the polymorph table whose field in the discrimination column stores the identifier of the old virtual table is removed. A test is then made at block 676 to verify whether no other virtual table has remained (for example, when the mapping table is empty). If so, the polymorph table with its discrimination table and mapping table are deleted at block 677 (since they are not used any longer).

For example, referring back to the database of the FIG. 4B, the removal of the old virtual table Cars with the old virtual columns Car_model, Engine and Plate of the medium_string data type, character data type and short_string data type, respectively (in addition to the primary key Car_id and the foreign key Employee_id) may be requested by submitting the following definition statement (intercepted by the mapper):

DELETE VIRTUAL TABLE Cars;

The removal of the old virtual columns Car_model and Plate does not allow the removal of any polymorph columns, since all the polymorph columns of the corresponding old data types are still required to map the remaining virtual columns, i.e., Medium1 for the virtual column PC_model of the virtual table PCs and the virtual column Phone_model of the virtual table Phones, and Short1, Short2 for the virtual columns OS,IPAddress of the virtual table PCs and the virtual columns IMEI,Number of the virtual table Phones, respectively. Conversely, the removal of the old virtual column Engine allows the removal of the old polymorph column Char1 (since it is not required to map any remaining virtual column). Therefore, the removal of the old virtual table Cars is implemented by the mapper submitting the following definition statement and manipulation statement to the RDBMS:

ALTER TABLE Polymorph_assets DELETE Char1;
DELETE * FROM Polymorph_assets WHERE (Asset_type="Cars");
DELETE * FROM MTable WHERE (CTable="Cars");

With reference now to the block 678, the flow of activity passes to block 681 as soon as a manipulation statement or a query is submitted (and it is intercepted as above); for example, the manipulation statement may be a request for updating or adding data and the query may be a request for retrieving data, in any case with reference to one or more selected virtual columns in a selected virtual table, or more (possibly conditioned). In response thereto, selected mapping information mapping each selected virtual column to the corresponding selected polymorph column is retrieved from the mapping table (i.e., the name of the polymorph column stored in the field of the record identified by each pair of names selected virtual table/selected virtual column). Continuing to block 684, the names of all the selected virtual tables are replaced in the manipulation statement/query with the name of the polymorph table; moreover, the name of each selected virtual column is replaced with the name of the corresponding selected polymorph column. A condition for the discrimination column of the polymorph table equal to the name of the selected virtual table is added at block 687 to the predicate of the manipulation statement/query. The manipulation statement/query so updated is run on the database at block 690. The flow of activity then branches at block 693 according to the type of the request. Particularly, if a query has been submitted the retrieved data is re-mapped, so as to assign the retrieved fields of each selected polymorph column to the corresponding selected virtual column. The flow of activity then passes to block 696; the same point is also reached directly from the block 693 if a manipulation statement has been submitted. In both cases, a result of the execution of the manipulation statement/query is returned (i.e., a return code thereof or the retrieved data, respectively). The flow of activity then passes to the blocks 606, 621, 645 and 678 waiting for the corresponding events.

For example, referring back to the database of the FIG. 4B, the retrieval of the IP addresses of the PCs assigned to a specific employee myEmployee that run a specific operating system myOS may be requested by submitting the following (virtual) query (intercepted by the mapper):

SELECT IPAddress FROM PCs
WHERE (Employee_id="myEmployee" AND OS="myOS");

This query is converted by the mapper replacing the name of the selected virtual columns IPAddress and OS with the name of the corresponding selected polymorph columns Short1 and Short2, and by adding the condition for the name of the selected virtual table PCs):

SELECT Short2 FROM Polymorph_assets
WHERE (Employee_id="myEmployee" AND Short1="myOS") AND
(Asset_type="PCs");

the (polymorph) query so transformed is submitted by the mapper to the RDBMS. For example, the running of the transformed query returns the following data of the selected polymorph column Short2:

Short2
myIP1
myIP2.

The mapper assigns the fields of each selected polymorph column to the corresponding selected virtual column, so as to restore the semantic of the retrieved data:

IPAddress
myIP1
myIP2.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for managing a database in a data-processing system. The method comprises the following steps. For a set of virtual tables (each one comprising a set of virtual columns each one of a data type) a polymorph table stored in the database and a mapping structure is provided. The polymorph table comprises a discrimination column for storing an identifier of the virtual tables and a total number of polymorph columns of each data type equal to a maximum number of the virtual columns of the data type in the virtual tables; the mapping structure stores mapping information mapping each virtual column to a corresponding one of the polymorph columns of the same data type. A virtual access request for accessing at least part of the virtual tables is received; the virtual access request is based on at least a selected one of the virtual columns of at least a selected one of the virtual tables. Selected mapping information mapping each selected virtual column to a selected one of the polymorph columns is retrieved from the mapping structure. The virtual access request is converted into a polymorph access request for the polymorph table according to the identifier of said at least one selected virtual table and the selected mapping information. The polymorph table is accessed according to the polymorph access request.

However, the database may be of any type, with any type and number of virtual tables (for example, of the object-oriented type). The polymorph table may comprise any discrimination column storing any identifier of the virtual tables (for example, a hash value), and it may comprise any number of columns for any data type (for example, pointers, enumerations, and so on). The mapping structure may be implemented in any way, even outside the database (for example, with an XML file). The virtual access request may be of any type, and it may be converted into the polymorph access request in any way (see below).

In an embodiment of the invention, each virtual table and the polymorph table are child tables of a parent table stored in the database; the parent table comprises at least one primary column being a primary key thereof, and each virtual table and the polymorph table comprises at least one foreign column being a foreign key referencing said primary key.

However, any type and number of child tables may reference any type and number of parent tables in any way; moreover, the primary keys and the foreign keys may be of any type (for example, a single column, or two or more columns in any combination thereof). In any case, the same method may also be applied to any generic set of virtual tables (even without any parent table being referenced).

In an embodiment of the invention, each polymorph column has a polymorph name comprising an indication of the data type of the polymorph column and an indication of a progressive number of the polymorph column within the total number of the polymorph columns of the same data type.

However, the data type and the progressive number may be indicated in the polymorph name in any way (for example, by mnemonic values of the data types or by time stamps); in any case, other naming conventions may be used (for example, with generic names that are mapped to the corresponding data types with a further mapping structure).

In an embodiment of the invention, the step of converting the virtual access request into a polymorph access request includes replacing a name of said at least one selected virtual table with a name of the polymorph table and a virtual name of each selected virtual column with a polymorph name of the corresponding selected polymorph column, and adding a condition for the discrimination column based on the identifier of said at least one selected virtual table.

However, the conversion may be implemented in any way according to the definition of the (virtual and polymorph) access requests (for example, CQL, COQL, LINQ, and the like).

In an embodiment of the invention, the step of accessing the polymorph table according to the polymorph access request includes the following operations. A set of selected records is retrieved from the polymorph table; for at least part of said at least one selected virtual columns each selected record comprises a selected field of the corresponding selected polymorph column. The selected fields of each selected polymorph column are assigned to the corresponding selected virtual column according to the selected mapping information. The selected records are returned with each selected field thereof associated with the assigned selected virtual column.

However, the selected data may be retrieved in any way (for example, with or without conditions, joined, grouped, ordered, and the like); moreover, each selected field thereof may be assigned to the corresponding selected virtual column in any way (for example, in graphical query interfaces).

In an embodiment of the invention, the step of providing, for a set of virtual tables each one comprising a set of virtual columns each one of a data type, a polymorph table stored in the database and a mapping structure includes the following operations. A request is received for adding a new virtual column of a new data type to a further selected virtual table. A new polymorph column of the new data type is added to the polymorph table if the addition of the new virtual column increases the maximum number of the virtual columns of the new data type in the virtual tables. New mapping information mapping the new virtual column to a first available one of the polymorph columns of the new data type is added to the mapping structure.

However, any number of new virtual columns may be added (either individually or concurrently); in any case, the condition for adding the new polymorph columns may be evaluated in any way (for example, by means of dedicated counters of the polymorph columns of each data type).

In an embodiment of the invention, the step of providing, for a set of virtual tables each one comprising a set of virtual columns each one of a data type, a polymorph table stored in the database and a mapping structure includes the following operations. A request is received for adding at least one new virtual table with a set of new virtual columns each one of a new data type to the virtual tables. For each new virtual column, said step of adding a new polymorph column and said step of adding new mapping information are repeated.

However, the new virtual table may be added in any way (for example, by adding its columns in succession or all together).

In an embodiment of the invention, the first available polymorph column of the new data type is the polymorph column being available with the polymorph name comprising the indication of the new data type and the lowest progressive number. The step of adding a new polymorph column includes assigning a new polymorph name to the new polymorph column obtained by incrementing the highest progressive number in the polymorph names comprising the indication of the new data type.

However, the first available polymorph column may be determined in any way (for example, according to its position in the polymorph table); in any case, the same operations may be performed even when another naming convention is used.

In an embodiment of the invention, the step of providing, for a set of virtual tables each one comprising a set of virtual columns each one of a data type, a polymorph table stored in the database and a mapping structure includes the following operations. A request is received for removing at least one old virtual column of an old data type from a still further selected virtual table. Old mapping information mapping the old virtual column to a corresponding old polymorph column is removed from the mapping structure. In each record of the polymorph table whose field in the discrimination column stores the identifier of the still further selected virtual table, a field in a last one of the polymorph columns of the old data type is copied into a field in the old polymorph column when the old polymorph column is different from the last polymorph column, if the removal of the old virtual column reduces the maximum number of the virtual columns of the old data type in the virtual tables. The old polymorph column is removed if the removal of the old virtual column reduces the maximum number of the virtual columns of the old data type in the virtual tables.

However, any number of old virtual columns may be removed (either individually or concurrently), and the condition for removing the old polymorph columns may be evaluated in any way (as above); in any case, nothing prevents removing another polymorph column and re-defining the mapping information accordingly.

In an embodiment of the invention, the last polymorph column of the old data type is the polymorph column with the highest progressive number in the polymorph names comprising the indication of the old data type.

However, in this case as well the last polymorph column may be determined in any way (for example, according to its position in the polymorph table), and the same operations may be performed even when another naming convention is used.

In an embodiment of the invention, the step of providing, for a set of virtual tables each one comprising a set of virtual columns each one of a data type, a polymorph table stored in the database and a mapping structure includes the following operations. A request is received for removing at least one old virtual table comprising a set of old virtual columns each one of an old data type. For each old virtual column, said step of removing old mapping information and said step of removing the old polymorph column are repeated. Each record whose field in the discrimination column stores the identifier of the old virtual table is removed from the polymorph table.

However, the old virtual table may be removed in any way (for example, by removing its column in succession or all together).

In any case, only parts of the above-mentioned requests, or different, additional or alternative requests may be supported (defined in any way and with any language).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the present invention provides a computer program comprising code means for causing a data-processing system to perform the steps of the above-described method when the computer program is executed on the data-processing system.

Another embodiment of the present invention provides a computer program product comprising a non-transitory computer readable medium embodying a computer program, the computer program comprising code means directly loadable into a working memory of a data-processing system thereby configuring the data-processing system to perform the same method.

However, the above-described solution may be implemented as a stand-alone module, as a plug-in for the RDBMS, or even directly in the RDBMS itself; alternatively, it is also possible to deploy the same solution as a service that is accessed through a network (such as in the Internet).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the present invention provides a data-processing system comprising means configured for performing the steps of the above-described method.

However, the same solution may also be carried out on a system based on a different architecture (for example, a local, wide area, global, cellular or satellite network), and exploiting any type of (wired and/or wireless) connections. In any case, each computer may have another structure or may comprise similar elements (such as cache memories temporarily storing the programs or parts thereof); moreover, it is possible to replace the computer with any data-processing, computing or code execution entity, either based on a physical machine or a virtual machine, or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A method for managing a database in a data-processing system, the method comprising:
providing a polymorph table and a mapping table for a set of virtual tables, each virtual table comprising a plurality of virtual columns having one or more data types, wherein each of the plurality of virtual columns has a corresponding data type of the one or more of data types;
wherein the polymorph table comprises:
a discrimination column for storing an identifier of each of the set of the virtual tables; and
a plurality of polymorph columns comprising, for each data type of the one or more data types, a set of type columns in a quantity equal to a maximum number, across the set of virtual tables, of virtual columns having the data type in each virtual table;
wherein the mapping table is configured to map each virtual column of the set of virtual tables to a corresponding polymorph column of the plurality of polymorph columns in the polymorph table, wherein the corresponding polymorph column of each virtual column has the same data type as the virtual column;
receiving from a user a virtual access request for accessing at least part of the virtual tables, the virtual access request being based on at least a selected virtual column of the plurality of virtual columns of at least a selected virtual table of the set of virtual tables;
retrieving from the mapping table selected mapping information mapping the selected virtual column to a selected polymorph column of the plurality of polymorph columns in the polymorph table, wherein one or more other virtual columns, of the plurality of virtual columns of the set of virtual tables, in addition to the selected virtual column map to the selected polymorph column;
converting the virtual access request into a polymorph access request for the polymorph table according to the identifier of said at least one selected virtual table and the selected polymorph column;
accessing the polymorph table according to the polymorph access request; and
returning to the user a result of accessing the polymorph table according to the polymorph access request.

2. The method according to claim 1, wherein the polymorph table and each virtual table of the set of virtual tables are child tables of a parent table stored in the database, the parent table comprising at least one primary column being a primary key thereof, and the polymorph table and each virtual table of the set of virtual tables each comprising at least one foreign column being a foreign key referencing said primary key.

3. The method according to claim 1, wherein each polymorph column of the plurality of polymorph columns of the polymorph table has a polymorph name comprising an indication of the data type of the polymorph column and an indication of a progressive number of the polymorph column within the total number of the polymorph columns of the same data type.

4. The method according to claim 1, wherein the converting the virtual access request into a polymorph access request comprises:
replacing a name of the selected virtual table with a name of the polymorph table and a virtual name of each selected virtual column with a polymorph name of the corresponding polymorph column; and
adding a condition for the discrimination column based on the identifier of the selected virtual table.

5. The method according to claim 1, wherein the accessing the polymorph table according to the polymorph access request comprises:
retrieving a set of selected records from the polymorph table, for at least part of the selected virtual column, each selected record comprising a selected field of the corresponding polymorph column;

assigning the selected field of the corresponding polymorph column to the selected virtual column according to the selected mapping information; and returning the set of selected records with each selected field thereof associated with the selected virtual column.

6. The method according to claim 1, wherein the providing the polymorph table and the mapping table comprises:

receiving a request for adding a new virtual column of a new data type to a further selected virtual table;

adding a new polymorph column of the new data type to the polymorph table if the addition of the new virtual column increases the maximum number, across the set of virtual tables, of virtual columns having the new data type in each virtual table; and adding to the mapping table new mapping information mapping the new virtual column to a first available one of the polymorph columns of the new data type.

7. The method according to claim 6, wherein the providing the polymorph table and the mapping table comprises:

receiving a request for adding to the set of virtual tables at least one new virtual table with a set of new virtual columns, each new virtual column having a new data type; and repeating, for each new virtual column, the adding a new polymorph column and the adding new mapping information.

8. The method according to claim 6, wherein each polymorph column of the plurality of polymorph columns has a polymorph name comprising an indication of the data type of the polymorph column and an indication of a progressive number of the polymorph column within the total number of the polymorph columns of the same data type, and wherein the first available polymorph column of the new data type is the polymorph column being available with the polymorph name comprising the indication of the new data type and the lowest progressive number, wherein the adding the new polymorph column comprises:

assigning a new polymorph name to the new polymorph column obtained by incrementing the highest progressive number in the polymorph names comprising the indication of the new data type.

9. The method according to claim 1, wherein the providing the polymorph table and the mapping table:

receiving a request for removing at least one old virtual column of an old data type from a further selected virtual table;

removing from the mapping table old mapping information mapping the old virtual column to a corresponding old polymorph column;

copying, in each record of the polymorph table whose field in the discrimination column stores the identifier of the further selected virtual table, a field in a last polymorph column of the old data type into a field in the old polymorph column when the old polymorph column is different from the last polymorph column, if the removal of the old virtual column reduces the maximum number, across the set of virtual tables, of virtual columns having the old data type in each virtual table; and removing the old polymorph column if the removal of the old virtual column reduces the maximum number, across the set of virtual tables, of virtual columns having the old data type in each virtual table.

10. The method according to claim 9, wherein each polymorph column of the plurality of polymorph columns of the polymorph table has a polymorph name comprising an indication of the data type of the polymorph column and an indication of a progressive number of the polymorph column within the total number of the polymorph columns of the same data type, and wherein the last polymorph column of the old data type is the polymorph column with the highest progressive number in the polymorph names comprising the indication of the old data type.

11. The method according to claim 9, wherein providing the polymorph table and the mapping table comprises:

receiving a request for removing at least one old virtual table comprising a set of old virtual columns, each virtual column one of an old data type;

repeating, for each old virtual column of the set of old virtual columns, the removing the old mapping information and the removing the old polymorph column; and removing each record from the polymorph table whose field in the discrimination column stores the identifier of the old virtual table.

12. A computer program product for facilitating communication between a client application and a server application, the computer program product comprising a computer readable storage medium having computer readable program code embodied therewith, the computer readable program code executable by a processor for:

providing a polymorph table and a mapping table for a set of virtual tables, each virtual table comprising a plurality of virtual columns having one or more data types, wherein each of the plurality of virtual columns has a corresponding data type of the one or more of data types;

wherein the polymorph table comprises:

a discrimination column for storing an identifier of each of the set of the virtual tables; and a plurality of polymorph columns comprising, for each data type of the one or more data types, a set of type columns in a quantity equal to a maximum number, across the set of virtual tables, of virtual columns having the data type in each virtual table;

wherein the mapping table is configured to map each virtual column of the set of virtual tables to a corresponding polymorph column of the plurality of polymorph columns in the polymorph table, wherein the corresponding polymorph column of each virtual column has the same data type as the virtual column;

receiving from a user a virtual access request for accessing at least part of the virtual tables, the virtual access request being based on at least a selected virtual column of the plurality of virtual columns of at least a selected virtual table of the set of virtual tables;

retrieving from the mapping table selected mapping information mapping the selected virtual column to a selected polymorph column of the plurality of polymorph columns in the polymorph table, wherein one or more other virtual columns, of the plurality of virtual columns of the set of virtual tables, in addition to the selected virtual column map to the selected polymorph column;

converting the virtual access request into a polymorph access request for the polymorph table according to the identifier of said at least one selected virtual table and the selected polymorph column;

accessing the polymorph table according to the polymorph access request; and returning to the user a result of accessing the polymorph table according to the polymorph access request.

13. The computer program product according to claim 12, wherein the polymorph table and each virtual table of the set of virtual tables are child tables of a parent table stored in the database, the parent table comprising at least one primary column being a primary key thereof, and the polymorph table and each virtual table of the set of virtual tables each comprising at least one foreign column being a foreign key referencing said primary key.

14. The computer program product according to claim 12, wherein each polymorph column of the plurality of polymorph columns of the polymorph table has a polymorph name comprising an indication of the data type of the polymorph column and an indication of a progressive number of the polymorph column within the total number of the polymorph columns of the same data type.

15. The computer program product according to claim 12, wherein the program code is further executable by the processor for:
  replacing a name of the selected virtual table with a name of the polymorph table and a virtual name of each selected virtual column with a polymorph name of the corresponding polymorph column; and
  adding a condition for the discrimination column based on the identifier of the selected virtual table.

16. The computer program product according to claim 12, wherein the program code is further executable by the processor for:
  retrieving a set of selected records from the polymorph table, for at least part of the selected virtual column, each selected record comprising a selected field of the corresponding polymorph column;
  assigning the selected field of the corresponding polymorph column to the selected virtual column according to the selected mapping information; and
  returning the set of selected records with each selected field thereof associated with the selected virtual column.

17. A system comprising:
  a processor configured to execute a module configured for:
    providing a polymorph table and a mapping table for a set of virtual tables, each virtual table comprising a plurality of virtual columns having one or more data types, wherein each of the plurality of virtual columns has a corresponding data type of the one or more of data types;
    wherein the polymorph table comprises:
      a discrimination column for storing an identifier of each of the set of the virtual tables; and
      a plurality of polymorph columns comprising, for each data type of the one or more data types, a set of type columns in a quantity equal to a maximum number, across the set of virtual tables, of virtual columns having the data type in each virtual table;
    wherein the mapping table is configured to map each virtual column of the set of virtual tables to a corresponding polymorph column of the plurality of polymorph columns in the polymorph table, wherein the corresponding polymorph column of each virtual column has the same data type as the virtual column;
    receiving from a user a virtual access request for accessing at least part of the virtual tables, the virtual access request being based on at least a selected virtual column of the plurality of virtual columns of at least a selected virtual table of the set of virtual tables;
    retrieving from the mapping table selected mapping information mapping the selected virtual column to a selected polymorph column of the plurality of polymorph columns in the polymorph table, wherein one or more other virtual columns, of the plurality of virtual columns of the set of virtual tables, in addition to the selected virtual column map to the selected polymorph column;
    converting the virtual access request into a polymorph access request for the polymorph table according to the identifier of said at least one selected virtual table and the selected polymorph column;
    accessing the polymorph table according to the polymorph access request; and
    returning to the user a result of accessing the polymorph table according to the polymorph access request.

18. The system according to claim 17, wherein the polymorph table and each virtual table of the set of virtual tables are child tables of a parent table stored in the database, the parent table comprising at least one primary column being a primary key thereof, and the polymorph table and each virtual table of the set of virtual tables each comprising at least one foreign column being a foreign key referencing said primary key.

19. The system according to claim 17, wherein each polymorph column of the plurality of polymorph columns of the polymorph table has a polymorph name comprising an indication of the data type of the polymorph column and an indication of a progressive number of the polymorph column within the total number of the polymorph columns of the same data type.

20. The system according to claim 17, wherein the converting the virtual access request into a polymorph access request comprises:
  replacing a name of the selected virtual table with a name of the polymorph table and a virtual name of each selected virtual column with a polymorph name of the corresponding polymorph column; and
  adding a condition for the discrimination column based on the identifier of the selected virtual table.

* * * * *